H. M. ROCKWELL.
BORE GAUGE.
APPLICATION FILED DEC. 1, 1919.
1,423,542.
Patented July 25, 1922.
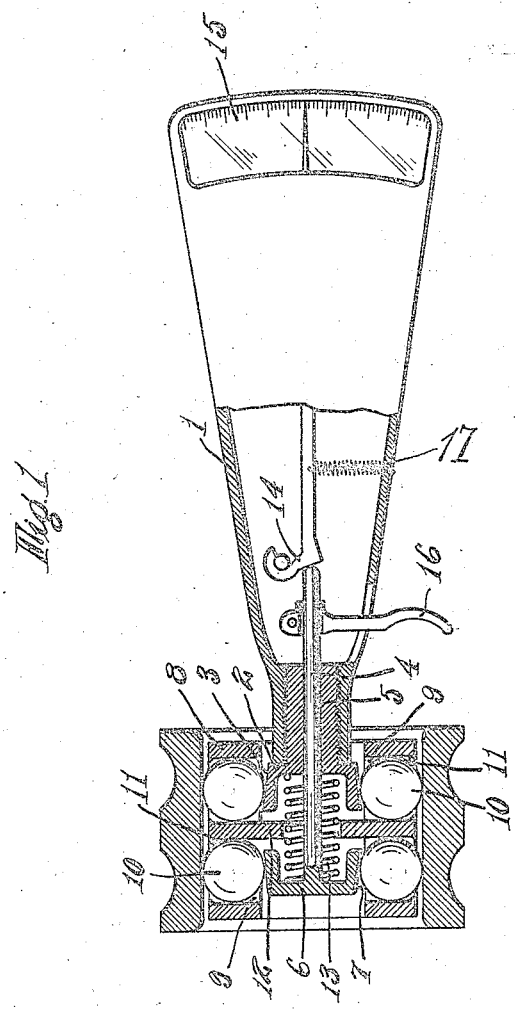
INVENTOR
Hugh M. Rockwell
BY
Edward C. Sasnett
ATTORNEY

UNITED STATES PATENT OFFICE.

HUGH M. ROCKWELL, OF BRISTOL, CONNECTICUT, ASSIGNOR, BY MESNE ASSIGNMENTS, TO STANDARD STEEL AND BEARINGS INCORPORATED, OF WILMINGTON, DELAWARE, A CORPORATION OF DELAWARE.

BORE GAUGE.

1,423,542.  Specification of Letters Patent.  Patented July 25, 1922.

Application filed December 1, 1919. Serial No. 341,771.

*To all whom it may concern:*

Be it known that I, HUGH M. ROCKWELL, a citizen of the United States, and a resident of Bristol, in the county of Hartford and State of Connecticut, have invented certain new and useful Improvements in Bore Gauges, of which the following is a specification.

This invention relates to measuring instruments, and more especially to a gauge for determining the diameter of a circular bore or the like, such, for example, as the bore of the inner race member of an antifriction bearing.

The sizing of bores, such as the above-noted example, is generally accomplished by causing the material in which is the bore to be rotated at a high rate of speed and apply a tool to the interior surface of the bore. To determine whether such a bore has been brought to the proper size, it has been the custom to cease operation upon the work, stop the rotation thereof, and insert into the bore a gauge of some description.

It is the object of this invention to provide a gauge by means of which the bore of a piece of work may be measured while the work is being rotated.

A further object of the invention is the provision of an instrument for accurately gaging the bore of a piece of work.

An additional object of the invention is the provision, in a bore gauge, of means to aline the axis of the gauge with the axis of the work.

To accomplish these objects and to improve generally upon devices of this class, I provide a frame, carrying at one end a head or plug having a conical surface. Coaxial and capable of axial displacement relative to said head, I provide a second head similar to said first head except that it is oppositely disposed. Surrounding the coacting heads and arranged for limited movement radially or axially of the two heads is a rotatable member provided with two annular rows of apertures in which are mounted contact elements, preferably steel balls, each of which is adapted to engage the surface of one of said heads and to project beyond the outer surface of said annular member. To cooperate with said movable head, I provide suitable indicating means, through the medium of which the bore diameter may be determined.

In use, this instrument is inserted in a bore of a rotating or stationary piece of work and the heads moved apart, the two rows of contact elements engaging the surface of the bore, and the contact-holding member adjusting itself. The engagement of both rows of contact elements with the bore surface brings the axis of the two heads into alinement with the axis of the bore, thus insuring accurate gaging since the planes of the lines of contact are perpendicular to the axis. The relative rotation of the work and the gauge does not affect the operation of the latter since the contact-holding member is free to rotate relative to the coacting heads.

In the accompanying drawings,

Fig. 1 is a side elevation, partly in section and partly broken away, of the gauge in use.

A frame 1 carries at its reduced end a plug or head 2 which is preferably screw-threaded into the frame. The peripheral surface 3 of the head is tapered and is preferably conical. Coaxial with the head 2 and carried by the shank 4, snugly but slidably mounted in a suitable bore 5 in the head 2, is the head 6, the peripheral surface 7 of which is similar to the surface 3 but oppositely disposed. Surrounding the heads 2 and 6, and arranged for limited movement radially or axially thereof is a rotatable member or cage 8, in which are provided two annular rows of apertures 9 in which are located the balls 10. Knobs or projections 11 at the outer end of the apertures prevent the escape of the balls therefrom. An annular rib 12 in the member 8 extends between the heads 2 and 6 and limits the axial movement of said member relative to the heads. A spring 13 interposed between the heads 2 and 6 serves to force the heads apart.

The inner end of the shank 4 acts on the lever 14, one arm of which is extended to cooperate with a dial 15 having indicia thereon by means of which variations in the position of the heads may be determined. The ratio of the distances of the point of engagement of the shank 4 with the lever 14 and the end of the indicator arm from the pivot point of the lever results in a substantial variation of position of the end of the indicator arm from a slight movement of the shank 4, thus clearly indicating slight differences in position of the heads 2 and 6. A finger lever 16 is connected with the shank 4 to operate the same against the action of the spring 13. A spring 17 serves to maintain the elbow of the lever 14 in contact with the end of the shank 4.

To utilize this gauge, the heads are drawn together by operation of the finger lever 16, thus allowing the balls to move inwardly. The end of the device carrying the heads, cage and balls, is then inserted into the bore and the lever 16 released, allowing the spring 13 to separate the heads 2 and 6. The tapered surfaces 3 and 7 engage the balls 10 and force them into contact with the surface of the bore. Since the cage 8 is loosely mounted, it automatically assumes a central position with respect to the heads 2 and 6. The contact of both rows of balls with the surface serves to automatically aline the gauge with the work being gaged and thus assure accurate measurment of the bore.

This gauge may be inserted in the bore to be gaged while the work is being rotated at a high rate of speed or while the work is stationary. In either event the balls will be moved into contact with the surface and the indicator will disclose the size of the bore.

It is understood, of course, that this gauge is intended primarily for comparative gaging. It is therefore necessary that such a gauge be first tested in connection with a member having therein a standard bore and a reading of the indicater taken, against which subsequent readings of other members may be checked.

What I claim is:

1. In a device of the character described, members having oppositely-disposed tapered peripheral surfaces, said members being movable relative to each other, a holder loosely surrounding said members and having a rib extending between said members, contact elements carried by said holder and adapted to contact with said members and the material to be gaged, and indicator means operatively associated with said members.

2. In a device of the character described, a frame, a member having an aperture carried by said frame, a second member, the peripheral surfaces of each member being tapered in opposite directions, a shank on said second member extending through said aperture, a holder loosely surrounding said members, means to limit the axial displacement of said holder, contact elements carried by said holder, and adapted to contact with said surfaces and the material to be gaged, means to move said second member relative to said first member, and indicator means operatively associated with said member.

3. In a device of the character described, a frame, a member mounted in one end of said frame, a second member mounted for movement relative to said first member, the peripheral surfaces of each member being tapered in opposite directions, a holder surrounding said members, contact elements carried by said holder and adapted to contact with said surfaces and the material to be gaged, a spring interposed between said members and adapted to force said movable member in one direction, a lever to move said member in the opposite direction, and indicator means operatively associated with said member.

4. In a device of the character described, a frame, a member having an aperture carried by said frame, a second member, the peripheral surfaces of each member being tapered in opposite directions, a shank on said second member extending through said aperture, a holder loosely surrounding said members, means to limit the axial displacement of said holder, contact elements carried by said holder and adapted to contact with said surfaces and the material to be gaged, a spring interposed between said members and adapted to force said movable member in one direction, a lever engaging the end of said shank and adapted to move said member in the opposite direction, and means to indicate relative change in position thereof.

5. In a device of the character described, a frame, a member having an aperture carried by said frame, a second member, the peripheral surfaces of each member being tapered in opposite directions, a shank on said second member extending through said aperture, a holder loosely surrounding said members, a rib on said holder extending between said members, balls carried by said holder and adapted to contact with said surfaces and the material to be gaged, a spring interposed between said members and adapted to force said movable member in one direction, a lever to move said member in the opposite direction, a lever engaged by the end of said shank, and means to indicate relative change in position thereof.

6. In a device of the character described, members having tapered peripheral surfaces, said members being movable relative to each other, a holder surrounding said members, and a plurality of sets of contact elements carried by said holder, each element of each set being adapted to engage one of said surfaces and the material to be gaged.

7. In a device of the character described, members having oppositely-disposed conical peripheries, said members being movable relative to each other, an annular member surrounding said members, and a plurality of sets of contact elements carried by said annular member, each element of each set being adapted to engage one of said surfaces and the material to be gaged.

8. In a device of the character described, members having tapered peripheral surfaces, said members being movable relative to each other, a holder loosely surrounding said members, means to limit the axial movement of said holder, and a plurality of sets of contact elements carried by said holder, each element of each set being adapted to engage one of said surfaces and the material to be gaged.

9. In a device of the character described, members having oppositely-disposed conical peripheries, said members being movable relative to each other, an annular member loosely surrounding said members, means to limit the axial movement of said annular member, and a plurality of sets of contact elements carried by said annular member, each element of each set being adapted to engage one of said surfaces and the material to be gaged.

10. In a device of the character described, a frame, a member mounted in one end of said frame, a second member mounted for movement relative to said first member, the peripheral surfaces of each member being tapered in opposite directions, a holder surrounding said members, two sets of contact elements carried by said holder, each element of each set being adapted to engage one of said surfaces and the material to be gaged.

11. In a device of the character described, members having oppositely-disposed tapered peripheral surfaces, said members being movable relative to each other, a holder loosely surrounding said members and having a rib extending between said members, sets of contact elements carried by said holder on opposite sides of said rib, each element of each set being adapted to engage one of said surfaces and the material to be gaged.

12. In a device of the character described, a frame, a member having an aperture carried by said frame, a second member, the peripheral surfaces of each member being tapered in opposite directions, a shank on said second member extending through said aperture, a holder loosely surrounding said members, means to limit the axial displacement of said holder, sets of contact elements carried by said holder on opposite sides of said rib, each element of each set being adapted to engage one of said surfaces and the material to be gaged.

13. In a device of the character described, a frame, a member mounted in one end of said frame, a second member mounted for movement relative to said first member, the peripheral surfaces of each member being tapered in opposite directions, a holder surrounding said members, sets of contact elements carried by said holder on opposite sides of said rib, each element of each of said sets being adapted to engage one of said surfaces and the material to be gaged, a spring interposed between said members and adapted to force said movable member in one direction, and a lever to move said member in the opposite direction.

14. In a device of the character described, a frame, a member having an aperture carried by said frame, a second member, the peripheral surfaces of each member being tapered in opposite directions, a shank on said second member extending through said aperture, a holder loosely surrounding said members, means to limit the axial displacement of said holder, sets of contact elements carried by said holder on opposite sides of said rib, each element of each of said sets being adapted to engage one of said surfaces and the material to be gaged, a spring interposed between said members and adapted to force said movable member in one direction, and a lever to move said member in the opposite direction, said lever being in contact with the end of said shank.

15. In a device of the character described, a frame, a member having an aperture carried by said frame, a second member, the peripheral surfaces of each member being tapered in opposite directions, a shank on said second member extending through said aperture, a holder loosely surrounding said members, a rib on said holder extending between said members, sets of balls carried by said holder, each ball of each set being adapted to engage one of said surfaces and the material to be gaged, a spring interposed between said members and adapted to force said movable member in one direction, a lever to move said member in the opposite direction, a lever engaged by the end of said shank, and means to indicate relative change in position thereof.

HUGH M. ROCKWELL.